US008423731B1

(12) United States Patent  (10) Patent No.: US 8,423,731 B1
Nadathur et al.  (45) Date of Patent: Apr. 16, 2013

(54) SYSTEM AND METHOD FOR AUTOMATIC SCHEDULING AND POLICY PROVISIONING FOR INFORMATION LIFECYCLE MANAGEMENT

(75) Inventors: Gokul Nadathur, Freemont, CA (US); Aseem Vaid, Santa Clara, CA (US)

(73) Assignee: NetApp, Inc., Sunnyvale, CA (US)

( * ) Notice: Subject to any disclaimer, the term of this patent is extended or adjusted under 35 U.S.C. 154(b) by 812 days.

(21) Appl. No.: 11/590,356

(22) Filed: Oct. 31, 2006

(51) Int. Cl.
    *G06F 12/00* (2006.01)
(52) U.S. Cl.
    USPC ......... 711/162; 711/100; 711/111; 711/112; 711/114; 711/115; 711/161; 707/640; 707/654; 707/655
(58) Field of Classification Search ............... 711/100, 711/111–112, 114, 115, 161–162; 707/640, 707/654, 655
    See application file for complete search history.

(56) References Cited

U.S. PATENT DOCUMENTS

| | | | |
|---|---|---|---|
| 4,570,217 A | 2/1986 | Allen et al. | |
| 5,124,987 A | 6/1992 | Milligan et al. | |
| 5,163,131 A | 11/1992 | Row et al. | |
| 5,202,979 A | 4/1993 | Hillis et al. | |
| 5,278,979 A | 1/1994 | Foster et al. | |
| 5,403,667 A | 4/1995 | Simoens | |
| 5,581,724 A | 12/1996 | Belsan et al. | |
| 5,758,359 A * | 5/1998 | Saxon | 707/644 |
| 5,966,730 A * | 10/1999 | Zulch | 711/162 |
| 6,061,770 A | 5/2000 | Franklin | |
| 6,081,875 A | 6/2000 | Clifton et al. | |
| 6,341,341 B1 | 1/2002 | Grummon et al. | |
| 6,397,348 B1 | 5/2002 | Styczinski | |
| 6,594,677 B2 * | 7/2003 | Davis et al. | 1/1 |
| 6,704,885 B1 * | 3/2004 | Salas-Meza et al. | 714/6.3 |
| 6,993,539 B2 | 1/2006 | Federwisch et al. | |
| 7,055,014 B1 | 5/2006 | Pawlowski et al. | |
| 7,080,105 B2 * | 7/2006 | Nakanishi et al. | 1/1 |
| 7,127,577 B2 | 10/2006 | Koning et al. | |
| 7,185,048 B2 * | 2/2007 | Arakawa et al. | 709/202 |
| 7,373,364 B1 | 5/2008 | Chapman | |
| 7,480,907 B1 * | 1/2009 | Marolia et al. | 717/174 |
| 7,567,993 B2 | 7/2009 | Trimmer et al. | |
| 7,681,069 B1 | 3/2010 | Chellappa et al. | |
| 7,707,184 B1 | 4/2010 | Zhang et al. | |

(Continued)

OTHER PUBLICATIONS

Akyurek, Sedat, *Placing Replicated Data to Reduce Seek Delays*, Department of Computer Science, University of Maryland, UMIACS-TR-91-121, CS-TR-2746, Aug. 1991.

(Continued)

*Primary Examiner* — Tuan Thai
*Assistant Examiner* — Zhuo Li
(74) *Attorney, Agent, or Firm* — Cesari and McKenna, LLP

(57) ABSTRACT

A system and method for managing automatic data protection features, e.g., backup scheduling and data storage capabilities, e.g., policy provisioning of a storage system to enable information lifecycle management of data served by the system. A novel management module executes within a storage operating system of the storage system to manage the automatic scheduling of backup operations for data based on a minimal set of user configurations. The management module cooperates with a mirroring application to manage the generation of persistent consistency point image (PCPIs) used as backups (replicas) of the data. The management module distributes the data containers scheduled for PCPI generation among time slots within a defined backup time window. At the appropriate time slot, each PCPI the data container is illustratively backed up from the primary storage space to the secondary storage space.

26 Claims, 8 Drawing Sheets

U.S. PATENT DOCUMENTS

| | | | |
|---|---|---|---|
| 7,904,679 | B2 | 3/2011 | Stager et al. |
| 7,966,293 | B1 | 6/2011 | Owara et al. |
| 2003/0177324 | A1* | 9/2003 | Timpanaro-Perrotta ...... 711/162 |
| 2003/0220948 | A1* | 11/2003 | Green et al. .................. 707/204 |
| 2006/0117157 | A1 | 6/2006 | Kitamura |
| 2006/0248294 | A1 | 11/2006 | Nedved et al. |
| 2007/0043737 | A1 | 2/2007 | Nagamatsu et al. |
| 2008/0046483 | A1* | 2/2008 | Lehr et al. ..................... 707/204 |

OTHER PUBLICATIONS

Bitton, Dina, *Disk Shadowing*, Proceedings of the 14$^{th}$ VLDB Conference, LA, CA 1988.

Chaudhuri, Surajit, et al., *Self-Tuning Technology in Microsoft SQL Server*, Data Engineering Journal 22, 2 1999 pp. 20-27.

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992; pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, 2 1999 pp. 33-40.

Kent, Jack et al., *Optimizing Shadow Recovery Algorithms*, IEEE Transactions on Software Engineering, 14( 2): 155-168 , Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached Worm File System*, Software-Practice and Experience, 21(12):1289-1299 1991.

Rosenblum, Mendel, et al., *The LFS Storage Manager*, Computer Science Division, Electrical Engineering and Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, 2 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, 2 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, 2 1999 pp. 28-32.

Weikum, Gerhard, et al., *Towards Self-Tuning Memory Management for Data Servers*, Data Engineering Journal 22, 2 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

Laplander et al. Nanobackup. Northern Arizona University, Aug. 3, 2005 [online] Retrieved from the Internet <URL:https://www4.nau.edu/its/mensa/services/Software/nanoBackup>.

\* cited by examiner

SYSTEM AND METHOD FOR AUTOMATIC SCHEDULING AND POLICY PROVISIONING FOR INFORMATION LIFECYCLE MANAGEMENT

FIELD OF THE INVENTION

The present invention relates to storage systems and, more specifically, to scheduling and policy provisioning of a storage system.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system organizes the data blocks within the vbn space as a "logical volume"; each logical volume may be, although is not necessarily, associated with its own file system. The file system typically consists of a contiguous range of vbns from zero to n, for a file system of size n+1 blocks.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

The storage operating system may further implement a storage module, such as a RAID system, that manages the storage and retrieval of the information to and from the disks in accordance with input/output (I/O) operations. The RAID system is also responsible for parity operations in the storage system. Note that the file system only "sees" the data disks within its vbn space; the parity disks are "hidden" from the file system and, thus, are only visible to the RAID system. The RAID system typically organizes the RAID groups into one large "physical" disk (i.e., a physical volume), such that the disk blocks are concatenated across all disks of all RAID groups. The logical volume maintained by the file system is then "disposed over" the physical volume maintained by the RAID system.

The storage system may be configured to operate according to a client/server model of information delivery to thereby allow many clients to access the directories, files and blocks stored on the system. In this model, the client may comprise an application, such as a database application, executing on a computer that "connects" to the stores age system over a computer network, such as a point-to-point link, shared local area network, wide area network or virtual private network implemented over a public network, such as the Internet. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

As can be appreciated, management of a storage system, described above, is typically a complicated job that requires specialized skills of e.g., an information technology (IT) professional staff. In modern competitive business environments, small and medium businesses may want to utilize the data storage capabilities and data protection features offered by the storage system. However, such small and medium businesses typically are not able to employ the IT staff needed to support the use of such a specialized system. Thus, these businesses typically utilize non-specialized computer storage systems, such as conventional Microsoft® Windows® based systems for data storage and retrieval. However, these non-specialized computer systems typically lack the full range of data storage capability and data protection features that are implemented in specialized storage systems. Thus, it is desirous to provide management of a storage system having such storage capabilities and protection features without the need for an IT support staff, to thereby enable storage system use by small and medium businesses.

SUMMARY OF THE INVENTION

The present invention overcomes the disadvantages of the prior art by providing a system and method for managing automatic data protection features, e.g., backup scheduling and data storage capabilities, e.g., policy provisioning of a storage system to enable information lifecycle management of data served by the system. The present invention may be implemented within the storage system to enable its use by small and medium businesses without the need for an information technology (IT) staff. To that end, the storage system illustratively includes primary and secondary storage spaces managed by the storage system to improve to ease of use. The primary storage space may be utilized as an active data store for day-to-day storage provisioning requirements, while the secondary storage space may be utilized for backup and/or disaster recovery purposes.

A novel management module executes within a storage operating system of the storage system to manage the automatic scheduling of backup operations for data based on a minimal set of user configurations. The management module cooperates with a mirroring application to manage the generation of persistent consistency point image (PCPIs) used as backups (replicas) of the data. The management module computes an optimal schedule by taking into account the constraints on the resources of the system and the mirroring application to effectively shorten the backup window. Furthermore, the management module also monitors the performance of the mirroring application under the current schedule and adjusts the backup window when the mirroring application deviates from the schedule. Such monitoring and adjustments occur automatically without requiring user intervention.

Illustratively, the data is organized as data containers stored on the storage system. A user configures the management module by identifying a starting time for performing backup operations, as well as defining a backup time window. The management module distributes the data containers scheduled for PCPI generation among time slots within the defined backup time window. At the appropriate time slot, each PCPI the data container is illustratively backed up from the primary storage space to the secondary storage space.

Furthermore, the management module is configured to enable a user to associate a business value importance and relevance rating to each PCPI data container, upon creation. The management module utilizes the business value importance and relevance rating to compute a priority for each PCPI data container. Using the computed priority, the management module may perform priority-based PCPI management on the secondary storage. For example, those PCPI data containers with higher priority are retained on the secondary storage longer than those with lower priorities. Should space become limited, lower priority PCPI data containers are deleted in favor of higher priority containers, etc.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage System Environment

Figure 1:
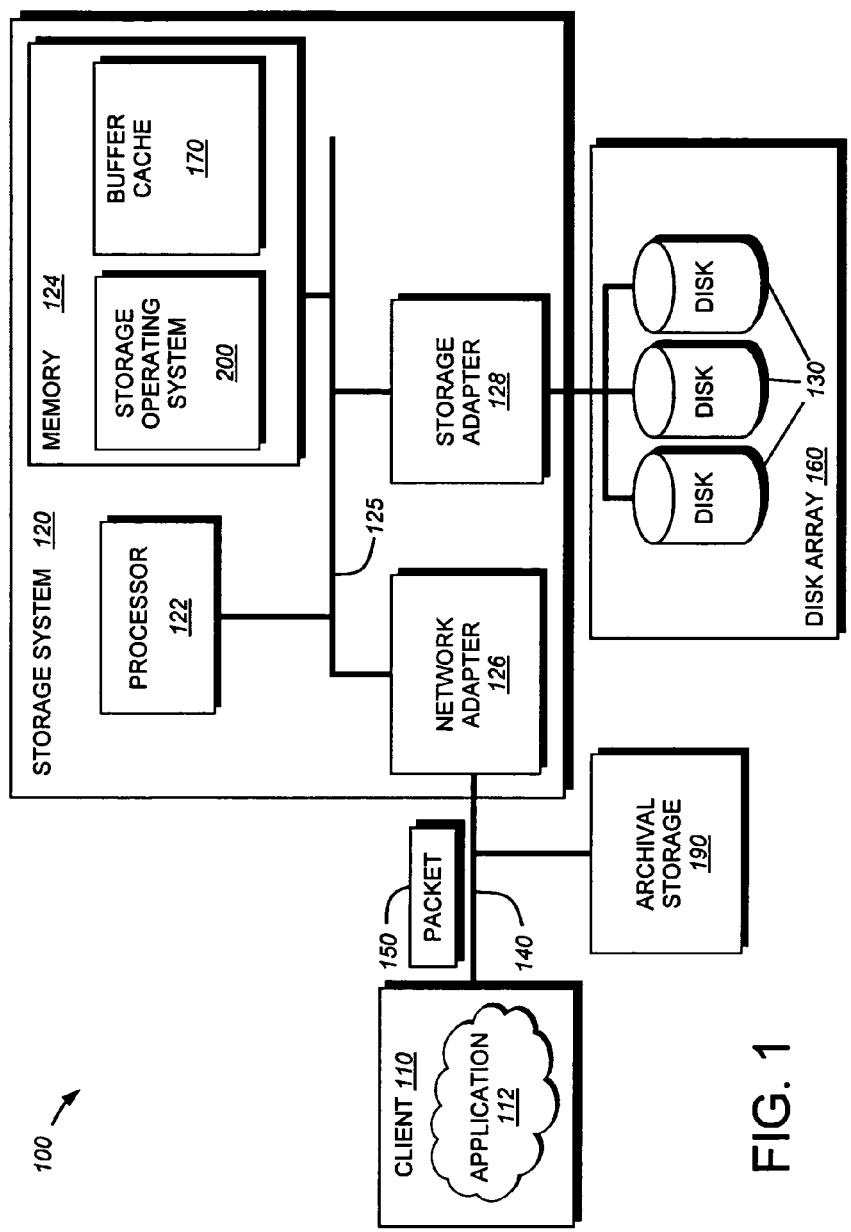
FIG. 1 is a schematic block diagram of an exemplary storage system environment in accordance with an embodiment of the present invention.

FIG. 1 is a schematic block diagram of an environment 100 including a storage system 120 that may be advantageously used with the present invention. The storage system is a computer that provides storage service relating to the organization of information on storage devices, such as disks 130 of a disk array 160. The storage system 120 comprises a processor 122, a memory 124, a network adapter 126 and a storage adapter 128 interconnected by a system bus 125. The storage system 120 also includes a storage operating system 200 that preferably implements a high-level module, such as a file system, to logically organize the information as a hierarchical structure of directories, files and special types of files called virtual disks on the disks.

In the illustrative embodiment, the memory 124 comprises storage locations that are addressable by the processor and adapters for storing software program code. A portion of the memory may be further organized as a "buffer cache" 170 for storing certain data structures associated with the present invention. The processor and adapters may, in turn, comprise processing elements and/or logic circuitry configured to execute the software code and manipulate the data structures. Storage operating system 200, portions of which is typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120 to a client 110 over a computer network 140, which may comprise a point-to-point connection or a shared medium, such as a local area network. Illustratively, the computer network 140 may be embodied as an Ethernet network or a Fibre Channel (FC) network. The client 110 may communicate with the storage system over network 140 by exchanging discrete frames or packets of data according to pre-defined protocols, such as the Transmission Control Protocol/Internet Protocol (TCP/IP).

The client 110 may be a general-purpose computer configured to execute applications 112. Moreover, the client 110 may interact with the storage system 120 in accordance with a client/server model of information delivery. That is, the client may request the services of the storage system, and the system may return the results of the services requested by the client, by exchanging packets 150 over the network 140. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter includes input/output (I/O) interface circuitry that couples to the disks over an I/O interconnect arrangement, such as a conventional high-performance, FC serial link topology.

Storage of information on array 160 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

In accordance with an illustrative embodiment of the present invention the storage operating system 200, described further below, implements a primary storage space and a secondary storage space on the disks 130. The primary storage space may be utilized for day-to-day operations of the storage system, whereas the secondary storage space may be utilized to perform data operations to implement data redundancy and/or data availability guarantees. However, in alternate embodiments, the storage operating system 200 may implement a single storage space on the disks 130 or, e.g., may implement additional and/or varying numbers of storage spaces on the disks 130. As such, the description of a primary and secondary storage space on the disks 130 should be taken as exemplary only.

Illustratively, archival storage 190 is operatively interconnected with the network 140. The archival storage is illustratively embodied as an archival storage server 190 may comprise a tape backup server, a near line storage server, etc. The archival storage server 190 may be utilized by the storage system 120 for storing long term archival data, e.g., data that is not utilized frequently, in accordance with the information lifecycle management technique described herein. In accordance with the illustrative embodiment of the present invention, a management module 297 (FIG. 2) of the storage operating system 200 may implement policy based management of the information lifecycle. As noted above, illustratively primary and secondary storage spaces are generated and maintained on the disks 130. Thus, in accordance with a typical information lifecycle, data may be first migrated from the primary to the secondary storage space. At a later point in time, the data may then be migrated to the archival storage server 190 for long-term storage. Alternately, data may be simply deleted from the secondary storage space and not stored on the archival server 190 based upon the rankings associated with the particular data, as described further below.

B. Storage Operating System

To facilitate access to the disks 130, the storage operating system 200 illustratively implements a write-anywhere file system that cooperates with virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is illustratively the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "Data ONTAP" is employed, it should be taken broadly to refer to any storage operating system that is otherwise adaptable to the teachings of this invention.

Figure 2:
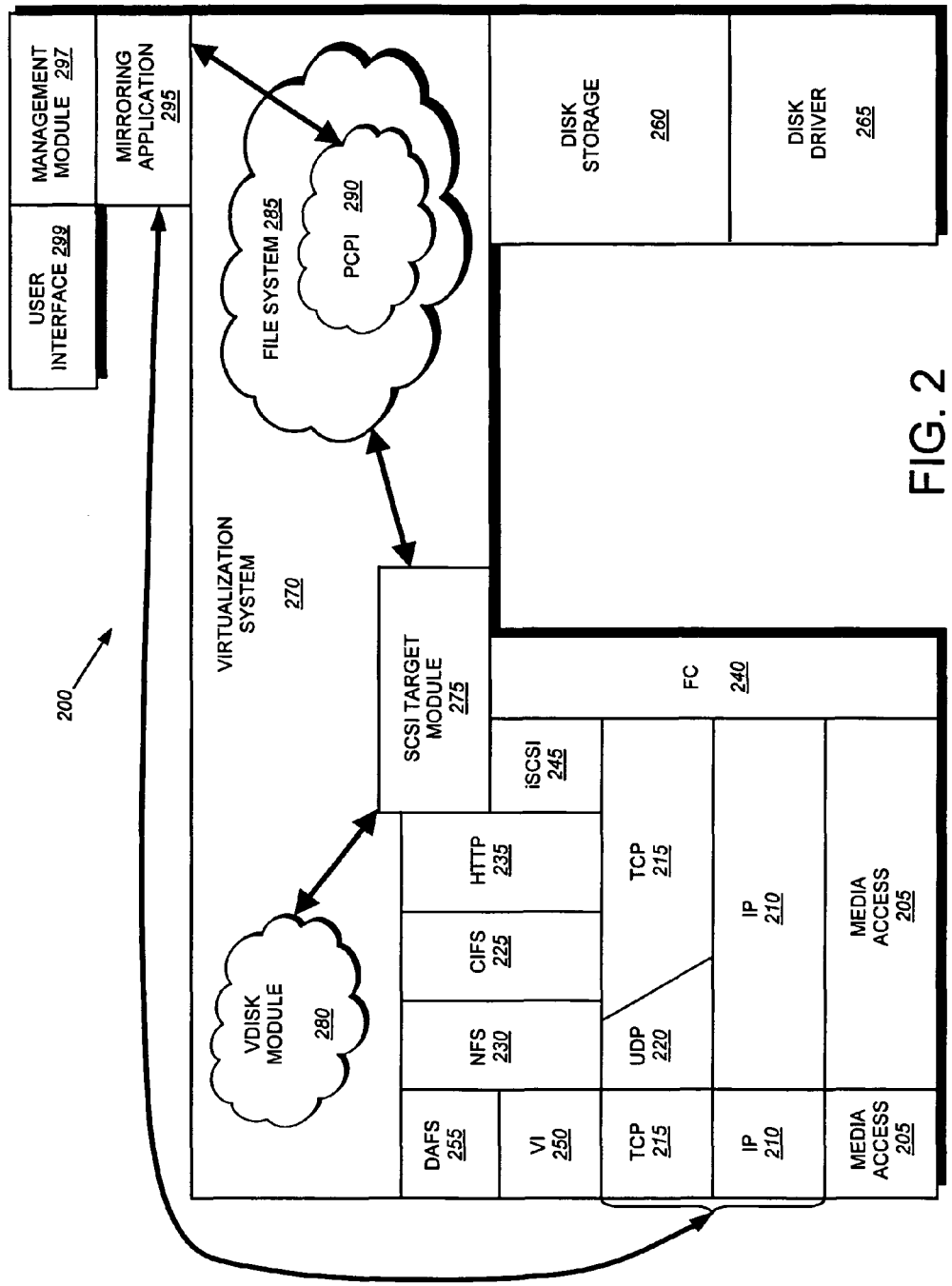
FIG. 2 is a schematic block diagram of an exemplary storage operating system that may be utilized with a storage system in accordance with an embodiment of the present invention.

FIG. 2 is a schematic block diagram of an exemplary storage operating system 200 that may be advantageously used with the present invention. The storage operating system comprises a series of software modules organized to form an integrated network protocol stack or, more generally, a multi-protocol engine that provides data paths for clients to access information stored on the storage system using block and file access protocols. The protocol stack includes a media access layer 205 of network drivers (e.g., gigabit Ethernet drivers) that interfaces to network protocol layers, such as the IP layer 210 and its supporting transport mechanisms, the TCP layer 215 and the User Datagram Protocol (UDP) layer 220. A file system protocol layer provides multi-protocol file access and, to that end, includes support for the Direct Access File System (DAFS) protocol 255, the NFS protocol 230, the CIFS protocol 225 and the Hypertext Transfer Protocol (HTTP) protocol 235. A VI layer 250 implements the VI architecture to provide direct access transport (DAT) capabilities, such as RDMA, as required by the DAFS protocol.

An iSCSI driver layer 245 provides block protocol access over the TCP/IP network protocol layers, while a FC driver layer 240 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a disk storage module 260 embodied as a RAID system that manages the storage and retrieval of information to and from the volumes/disks in accordance with I/O operations, and a disk driver system 265 that implements a disk access protocol such as, e.g., the SCSI protocol.

Bridging the disk software layers with the integrated network protocol stack layers is a virtualization system 270 that is implemented by a file system interacting with virtualization modules illustratively embodied as, e.g., vdisk module 280 and SCSI target module 275. The vdisk module 280 is layered on the file system to enable access by administrative interfaces, such as a user interface, in response to a user (system administrator) issuing commands to the storage system. A user interface (UI) module 299 implements the UI to enable an administrator to easily configure the storage system 120 and storage operating system 200. The UI module 299 may implement a command line interface (CLI) and/or a graphical user interface (GUI). The SCSI target module 275 is disposed between the FC and iSCSI drivers and the file system to provide a translation layer of the virtualization system between the block (lun) space and the file system space, where luns are represented as blocks.

The file system is illustratively a message-based system that provides logical volume management capabilities for use in access to the information stored on the storage devices, such as disks. That is, in addition to providing file system semantics, the file system provides functions normally associated with a volume manager. These functions include (i) aggregation of the disks, (ii) aggregation of storage bandwidth of the disks, and (iii) reliability guarantees, such as mirroring and/or parity (RAID). The file system illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (FS) info block specifies the layout of information in the file system and includes an inode of a file that includes all other inodes of the file system. Each logical volume (file system) has an FS info block that is preferably stored at a fixed location within, e.g., a RAID group. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client is forwarded as a packet 150 over the computer network 140 and onto the storage system where it is received at the network adapter. A network driver (of layer 205 or layer 240) processes the packet and, if appropriate, passes it on to a network protocol and file access layer for additional processing prior to forwarding to the write-anywhere file system 285. Here, the file system generates operations to load (retrieve) the requested data from disk if it is not resident "in core," i.e., in memory 124. If the information is not in the memory, the file system indexes into the inode file using the inode number to access an appropriate entry and retrieve a logical vbn. The file system then passes a message structure including the logical vbn to the RAID system 260; the logical vbn is mapped to a disk identifier and disk block number (disk,dbn) and sent to an appropriate driver (e.g., SCSI) of the disk driver system 265. The disk driver accesses the dbn from the specified disk and loads the requested data block(s) in memory 124 for processing by the storage system. Upon completion of the request, the storage system (and operating system) returns a reply to the client over is the network 140.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. Storage systems may include, e.g., dedicated storage appliances, distributed storage systems arranged in a grid architecture, small footprint systems designed for use by small and medium businesses, etc. As such, the term storage system should be taken to mean any computer configured to perform storage functions. A storage system may be dedicated to storage functionality or may include other functionality, e.g., a file server application executing on a general purpose application server. In this sense, the Data ONTAP® software is an example of such a storage operating system implemented as a microkernel and including a file system 285 to implement the WAFL file system semantics and manage data access. The storage operating system can also be implemented as an application program operating over a general-purpose operating system, such as UNIX® or Windows XP®, or as a general-purpose operating system with configurable functionality, which is configured for storage applications as described herein.

The file system 285 also includes a set of persistent consistency point image (PCPI) processes 290 that enable the file system to generate PCPIs of active file system, as described further below. More generally, the processes 290 enable the file system to generate PCPI data containers of volumes that are illustratively organized as data containers. Generation of PCPIs may be utilized by the management module 297 for use in performing backup operations between the primary and secondary storage spaces on the storage system. Furthermore, the PCPI data containers may be utilized for information lifecycle management at particular points in time, e.g., a PCPI data container of particularly valuable data may be scheduled to be retained for a certain period of time, whereas PCPI data containers of less valuable data may be permitted to be deleted.

A mirroring application module 295 of the storage operating system 200 illustratively generates appropriate mirrors (replicas) of data sets and manages data backups in accordance with an embodiment of the present invention. One exemplary mirroring technique is described in U.S. patent application Ser. No. 10/100,967, entitled SYSTEM AND METHOD FOR DETERMINING CHANGES IN TWO SNAPSHOTS AND FOR TRANSMITTING CHANGES TO A DESTINATION SNAPSHOT, by Michael L. Federwisch, et al., now U.S. Pat. No. 6,993,539 issued on Jan. 31, 2006, the contents of which are hereby incorporated by reference.

In an illustrative embodiment, a management module 297 cooperates with the mirroring application module 295 and the virtualization system 270 to manage automatic backup scheduling and policy provisioning in accordance with the teachings of the present invention. The management module 297 also implements the information lifecycle management functionality of the present invention. That is, the management module 297 utilizes business relevance and/or other values provided by a user when creating a volume (or other data container) to assign a ranking to a particular the volume. The business relevance and/or other values may be numeric, e.g., 1-100, qualitative, e.g., low-medium-high, etc., and may be set either by the administrator or by processes executing within the storage system. An administrator may enter values when initially configuring a volume suing the UI. E.g., a CLI and/or GUI, associated with the storage system. The rankings may be computed by the management module 297 using a variety of techniques. For example, the rankings may be a numeric sum of the various values, a sum calculated using a weighted polynomial expression, defined in a table when utilizing qualitative values, etc. Exemplary ranking algorithms are described further below. The rankings are utilized to perform a set of policy based information lifecycle management decisions, such as determining retention times for data, deciding when to migrate data from primary to secondary storage and/or from secondary storage to archival storage, etc., as described further herein.

C. Persistent Consistency Point Images

In certain mirroring applications, a storage system may utilize a PCPI to generate a replica of a data set, such as a data container. For example, a source storage system ("source") may generate a baseline PCPI that is transferred to a destination storage system ("destination") as a replica of a data contain on the source. Subsequently, the source may generate a second PCPI that includes any subsequent changes to the data container. The mirroring application module 295 determines the changes between the baseline and the second PCPIs, and transmits only those changes to the destination. The destination may then update its file system and generate a second PCPI so that the baseline and second PCPIs are identical on both the source and destination.

In an illustrative embodiment, the management module 297 may maintain separate primary and secondary storage spaces on the storage system. In such an embodiment, the "source" and "destination" storage systems may physically comprise the same storage system. However, for backup operations, the same may comprises the primary storage space, while the destination may comprise the secondary storage space (or vice versa).

PCPIs are generally created on a regular schedule that may be subject to great variation. In addition, the number of PCPIs retained by the storage system is highly variable. Under one storage arrangement, a number of recent PCPIs is stored in succession (for example, a few days worth of PCPIs, each taken at four-hour intervals), and a number of older PCPIs is retained at increasing time intervals (spacings) (for example, a number of daily PCPIs for the previous week(s) and weekly PCPIs for the previous few months). Each PCPI is stored on-disk along with the active file system, and is loaded into the memory 124 of the storage system as requested by the storage operating system 200 or mirroring application 295. However, it is contemplated that a variety of PCPI creation and timing techniques can be implemented within the teachings of this invention.

Figure 3:
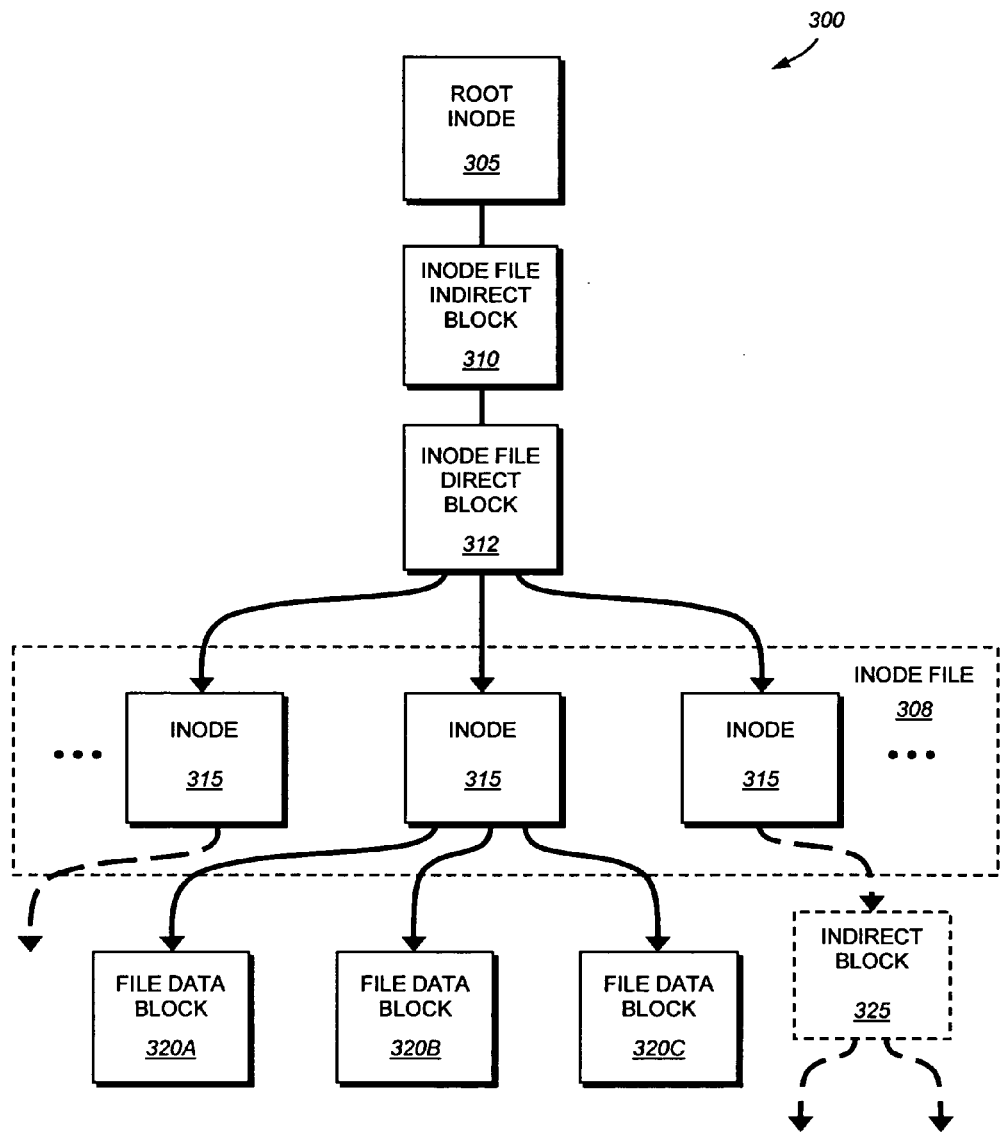
FIG. 3 is a schematic block diagram of an exemplary on-disk Mode arrangement in accordance with an embodiment of the present invention.

An exemplary file system inode structure 300 according to an illustrative embodiment is shown in FIG. 3. The inode for the inode file or more generally, the "root" inode 305 contains information describing inode file 308 associated with a file system. In this exemplary file system inode structure, root inode 305 contains a pointer to an inode file indirect block 310. The inode file indirect block 310 points to one or more inode file direct blocks 312, each containing a set of pointers to inodes 315 that make up the inode file 308. The inode file 308 is illustratively organized into volume blocks (not separately shown) comprising inodes 315 which, in turn, contain pointers to file data (or "disk") blocks 320A, 320B and 320C. FIG. 3 is simplified to show just the inode itself containing pointers to the file data blocks. Each of the file data blocks 320 A-C is adapted to store, in the illustrative embodiment, 4 kilobytes (KB) of data. Note, however, where more than a predetermined number of file data blocks are referenced by an inode 315, one or more indirect blocks 325 (shown in phantom) are used. These indirect blocks point to associated file data blocks (not shown).

Figure 4:
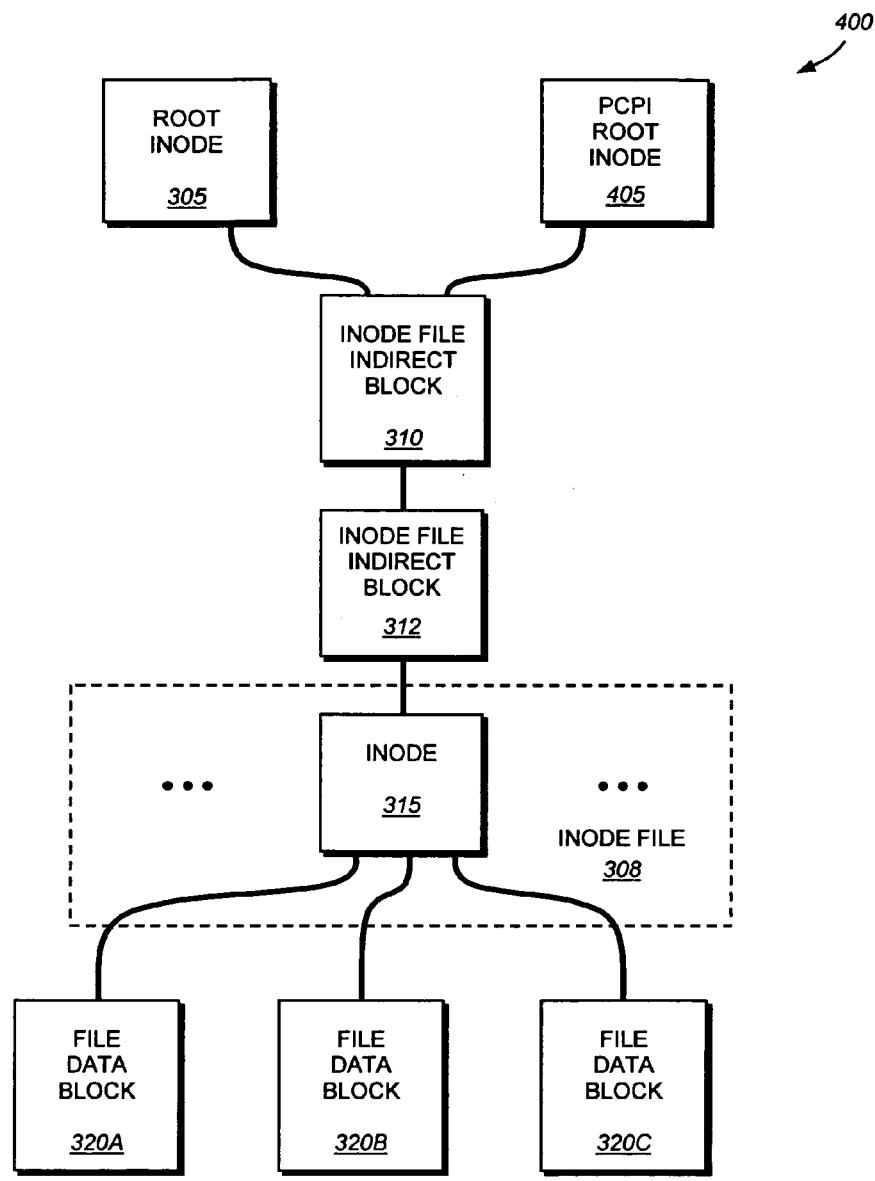
FIG. 4 is a schematic block diagram of an exemplary on-disk data structure showing the generation of a persistent consistency point image in accordance with an embodiment of the present invention.

When a PCPI of the file system is generated, a PCPI root inode is also generated as shown in FIG. 4. The PCPI root inode 405 is, in essence, a duplicate copy of the root inode 305 of the file system 300. Thus, the exemplary file system structure 400 includes the same inode file indirect block 310, inode file direct block 312, inodes 315 and file data blocks 320(A-C) as depicted in FIG. 3. When a user modifies a file data block, the file system writes the new data block to disk and changes the active file system to point to the newly created block.

Figure 5:
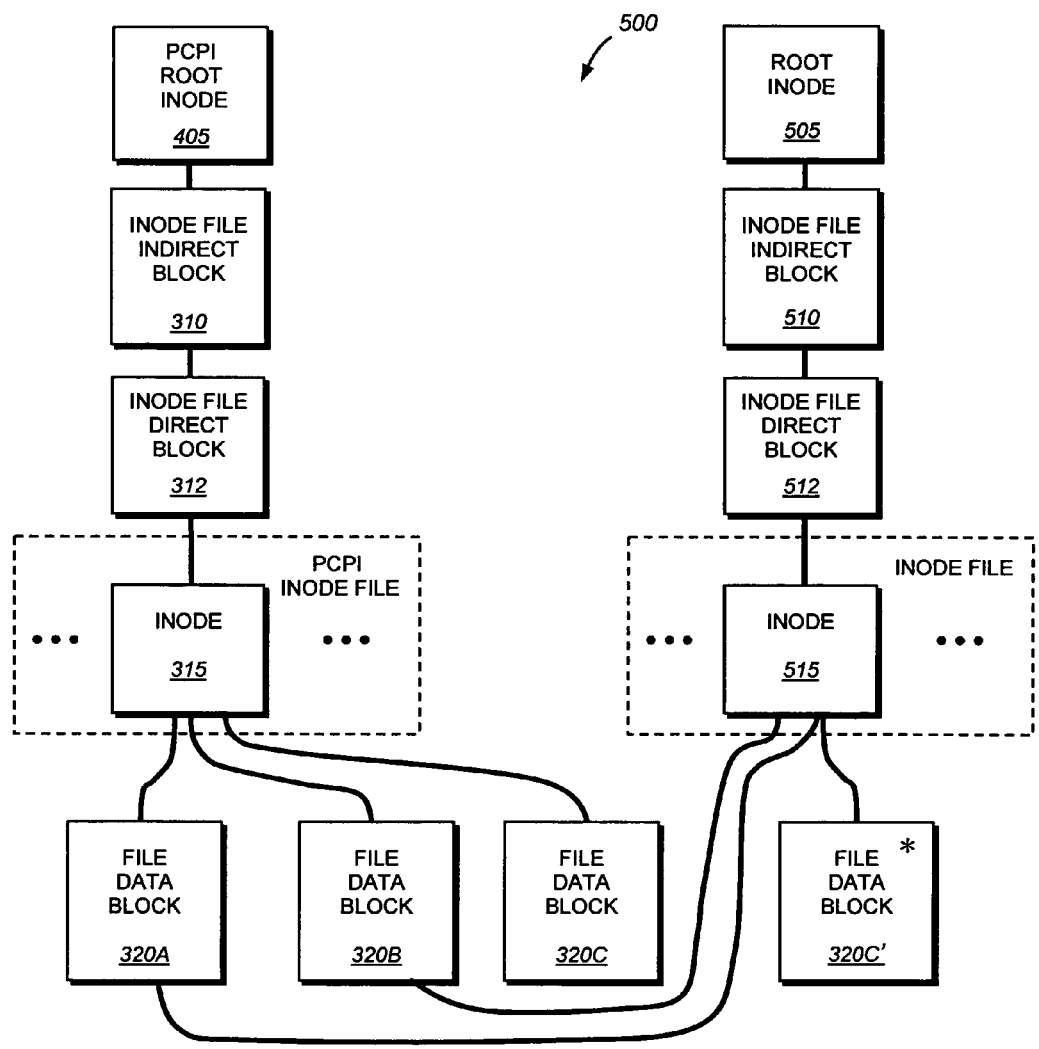
FIG. 5 is a schematic block diagram of an exemplary on-disk data structure showing divergence between an active file system and a persistent consistency point image after a write operation in accordance with an embodiment of the present invention.

FIG. 5 shows an exemplary inode file system structure 500 after a file data block has been modified. In this illustrative example, file data stored at disk block 320C is modified. The file system writes the modified contents to disk block 320C', which is a new location on disk. Because of this new location, the inode file data which is stored at disk block 315 is rewritten to point to block 320C'. This modification causes the file system to allocate a new disk block 515 for the updated version of the inode data at 315. Similarly, the inode file indirect block 310 is rewritten to block 510 and inode file direct block 312 is rewritten to block 512, to point to the newly rewritten inode 515. Thus, after a file data block has been modified the PCPI root inode 405 contains a pointer to the original inode file system indirect block 310 which, in turn, contains a link to the inode 315. This inode 315 contains pointers to the original file data blocks 320A, 320B and 320C. The newly written inode 515 also includes pointers to unmodified file data blocks 320A and 320B. However, the inode 515 further contains a pointer to the modified file data block 320C' representing the new arrangement of the active file system. A new file system root inode 505 is established representing the new structure 500. Note that metadata in any PCPI blocks (e.g. blocks 310, 315 and 320C) protects these blocks from being recycled or overwritten until they are released from all PCPIs. Thus, while the active file system root inode 505 points to new blocks 510, 512, 515 and 320C', the old blocks 310, 315 and 320C are retained until the PCPI is fully released.

In accordance with an illustrative embodiment of the present invention, the mirroring application module 295 may permit the mirroring of various PCPIs between a source and destination. This may be due to, for example, incremental changes that are sent at various points in time, which are represented within the file systems as persistent PCPIs. As noted, a first PCPI is utilized to perform a baseline backup to the destination. At some later point in time a second PCPI is generated, which is compared with the first PCPI to generate a set of changes that is transferred to the destination. As further noted above, the destination may comprise the secondary storage of the storage system in accordance with an illustrative embodiment the present invention.

D. Automatic Scheduling and Provisioning

The present invention provides a system and method for managing automatic data protection features, e.g., backup scheduling and data storage capabilities, e.g., policy provisioning of a storage system to enable information lifecycle management of data served by the system. Information lifecycle management (ILM) may generally be defined as a collection of policies, procedure and practices utilized to align the business value of information with the most appropriate and cost effective storage infrastructure from the creation of the information until its final disposition, e.g., from the creation of a data container, through its migration to archival storage until its final deletion, etc.

The present invention may be implemented within the storage system to enable its use by small and medium businesses without the need for an information technology (IT) staff. To that end, the storage system illustratively includes primary and secondary storage spaces managed by the storage system to improve to ease of use. The primary storage space may be utilized as an active data store for day-to-day storage provisioning requirements, while the secondary storage space may be utilized for backup and/or disaster recovery purposes.

A novel management module executes within a storage operating system of the storage system to manage the automatic scheduling of backup operations for data based on a minimal set of user configurations. The management module cooperates with a mirroring application to manage the generation of persistent consistency point image (PCPIs) used as backups (replicas) of the data. Illustratively, the data is organized as data containers stored on the storage system. A user configures the management module by identifying a starting time for performing backup operations, as well as defining a backup time window. The management module distributes the data containers scheduled for PCPI generation among time slots within the defined backup time window. At the appropriate time slot, each PCPI the data container is illustratively backed up from the primary storage space to the secondary storage space.

Furthermore, the management module is configured to enable a user to associate a business value importance and relevance rating to each PCPI data container, upon creation. The management module utilizes the business value importance and relevance rating to compute a priority for each PCPI data container, as described further below. Using the computed priority, the management module may perform priority-based PCPI management on the secondary storage. For example, those PCPI data containers with higher priority are retained on the secondary storage longer than those with lower priorities. Should space become limited, lower priority PCPI data containers are deleted in favor of higher priority containers, etc.

Figure 6:
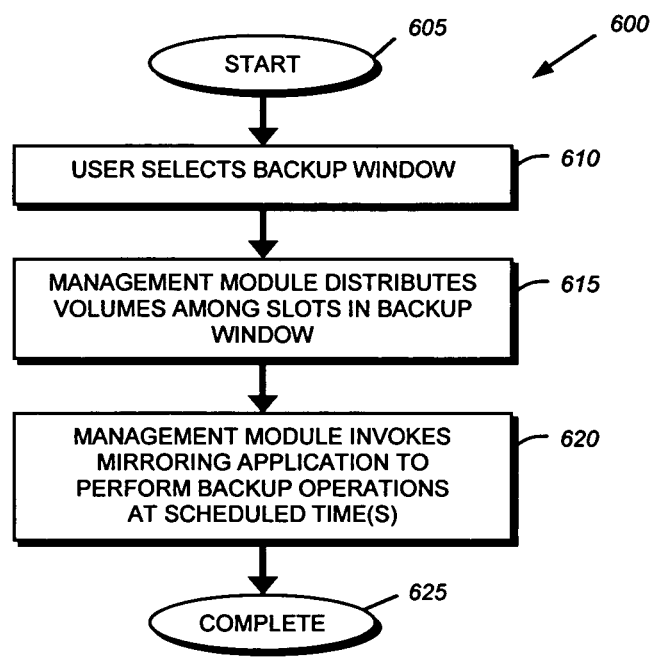
FIG. 6 is a flowchart detailing the steps of a procedure for initiating and distributing backups among a user-defined backup window in accordance with an embodiment of the present invention.

FIG. 6 is a flowchart detailing the steps of a procedure 600 for performing automated backup operations in accordance with an embodiment of the present invention. The procedure 600 begins in step 605 continues to step 610 where a user selects (defines) a backup time window. Illustratively, the user specifies, via the UI module 299, a length of the backup window and a starting time. For example, a user may define a backup time window that is five hours long and commences at 11 p.m., i.e., a backup window between 11 p.m. and 4 a.m. This may be defined using the CLI or GUI implemented by the UI module to provide ease of use for administrators. Users typically select the backup window to coincide with periods of time where a small number of data access operations are expected to be directed to the storage system. For many small and medium businesses, this time period is typically overnight; however, depending on the location of the business and/or the type of business, the time period may be at other times.

Once the user has selected a backup window in step 610, the management module 297 distributes data containers, such as volumes, of the primary storage among the available time slots within the backup window in step 615. As used herein, a time slot is a time period within the overall backup time window that is long enough to provide a high probability that a backup operation will complete within the time. The length of a time slot may vary depending on the average size of the data containers being backed up and/or the size of changes needed to be transferred. In accordance with the illustrative embodiment, backup operations are typically scheduled as far apart as possible to avoid the possibility of contention. For example, if a backup window is five hours long and two backup operations are to be performed, a first backup operation may be scheduled at the beginning of the five hour time period. The second backup operation may be scheduled to begin 2½ hours into the five-hour window, thereby attempting to avoid any contention by ensuring that a maximum amount of time is available for use by the backup operations. Similarly, if a third backup operation is to be included within the backup window, then the management module 297 may schedule the first operation to begin at the start of the illustrative five hour window, the second operation to start one hour and forty minutes into the five hour period and the third operation to start three hours and twenty minutes into the backup window. Should the number of backup operations exceed the number of available time slots within the backup window, the management module may display an error message to the administrator that, e.g., suggesting lengthening the backup window. In an alternate embodiment, the management module may automatically lengthen the backup window to permit additional time slots to be apportioned therein. In such embodiments, the backup window is illustratively expanded by 50%, i.e., if the backup window is currently X house long, the lengthened backup window is 1.5 times X long. For example, if X=6 then the expanded backup window would be 1.5 times 6, or 9, hours long. Illustratively, the administrator may identify a maximum length of the backup window, so that should the management module need to expand the backup window beyond the maximum length, backup operations would be aborted and the administrator notified.

Once the volumes have been distributed among the available time slots within the backup window, the management module, in step 620, invokes the mirroring application 295 to perform the required backup operations at the scheduled times, i.e., to initiate backup operations of each of the volumes during its identified time slot. The backup operations may be performed using the technique described in the above-incorporated U.S. patent application entitled SYSTEM AND METHOD FOR DETERMINING CHANGES IN TWO SNAPSHOTS AND FOR TRANSMITTING CHANGES TO A DESTINATION SNAPSHOT. Should a collision occur between two backup operations, i.e., the initiation of a second backup is attempted while a first backup operation has not completed, the management module illustratively expands the backup window and moves the failed backup operation to a time slot within the expanded backup window. As noted above, the length of a backup window may not be expanded indefinitely. As such, should the management module attempt to expand the backup window beyond a user defined maximum, those backup operations that have not begun are aborted. The procedure 600 then completes in step 625.

As noted above, each of these backup operations is performed during its appropriately scheduled time slot, thereby automating the backup operations while only requiring minimal configuration from an administrator, i.e., identifying the start and length of the backup window.

Figure 7:
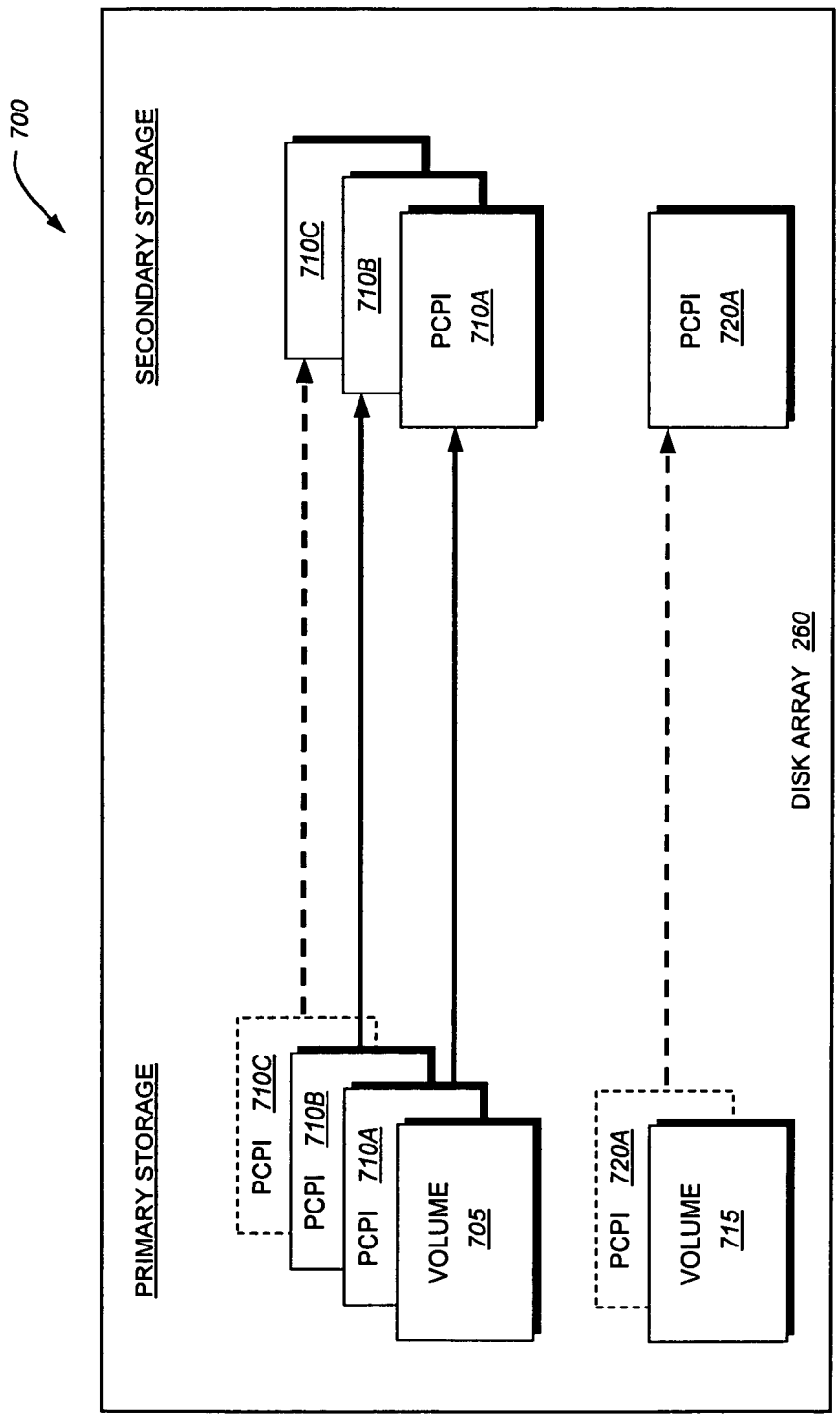
FIG. 7 is a schematic block diagram illustrating the backup and retention of volumes within a storage system in accordance with an embodiment of the present invention.

FIG. 7 is schematic block diagram of an exemplary environment 700 showing backup relations between primary storage and secondary storage in accordance with an embodiment of the present invention. As noted above, the management module 297 typically generates a mirroring relationship between portions of the storage space identified as primary storage and secondary storage within the disk array 160 of the storage system 120. However, in alternate embodiments, the primary and secondary storage spaces may reside on differing disk arrays and/or storage systems. As such, the description of primary and secondary storage spaces residing on a single storage system should be taken as exemplary.

Thus, for example, within the primary storage there may be a volume 705 associated with a plurality of PCPIs 710 A, B, C, etc. PCPI 710A may be mirrored via the above-described mirroring operations to secondary storage. Similarly, PCPI 710B may be mirrored to secondary storage. PCPI 710 C, which may have been deleted from primary storage, may have been previously mirrored to the secondary storage. PCPI retention policies may be implemented in accordance with an embodiment of the present invention utilizing priority based management, described further below. In addition, a second volume 715 may reside within primary storage, while a PCPI 720A of the volume may be mirrored to secondary storage. As noted above, and described further below, the number of PCPIs retained on secondary storage may vary in accordance with the policy-based management of the present invention.

Thus, for example, PCPIs of volumes that have a high importance and/or relevance value and therefore have a higher priority, as described further below, may have a significantly larger number of PCPIs retained on the secondary storage then volumes having a lower priority. Furthermore, volumes having significantly lower priorities may have PCPIs moved to the archival storage server 190, to thereby free storage space should the need arise. For example, if storage space becomes scarce due to the number of PCPIs retained, growth of volumes, etc. the lower prioritized PCPIs may be migrated to archival storage server 190 from the secondary storage space, thereby freeing space for higher prioritized volumes and/or PCPIs. By managing the information lifecycle of the volumes, the management module ensures that the most highly valued data is safely backed up and available for access, either from the primary storage space or the secondary storage space.

Figure 8:
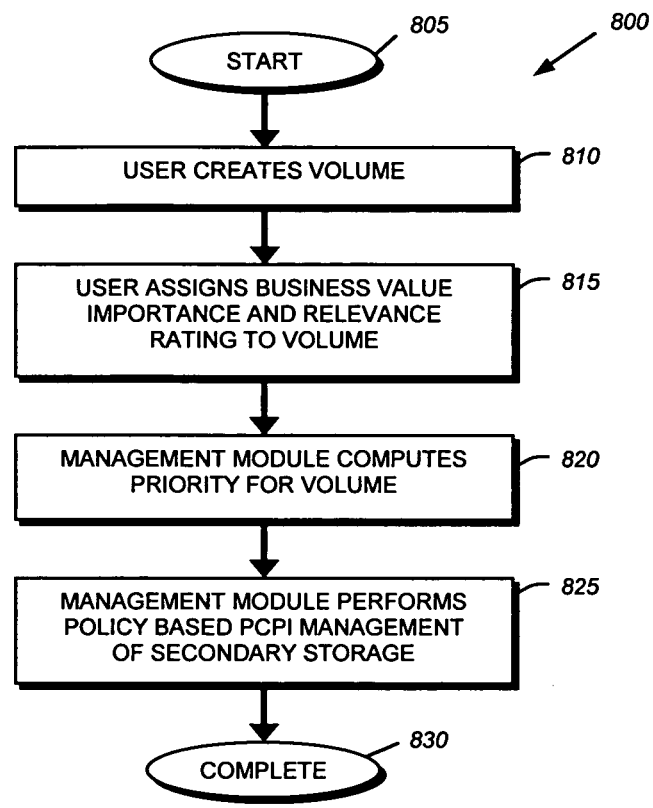
FIG. 8 is a flowchart illustrating the steps of a procedure for policy-based persistent consistency point image management of backups in accordance with an embodiment of the present invention.

FIG. 8 is a flowchart detailing the steps of a procedure 800 for implementing policy based PCPI management in accordance with an embodiment of the present invention. The procedure 800 begins in step 805 and continues to step 810 where a user creates a data container, such as a volume. A user may create the volume using any volume creation technique, such as a described in U.S. Pat. No. 7,055,014, entitled USER INTERFACE SYSTEM FOR A MULTI-PROTOCOL STORAGE APPLIANCE, by Brian Pawlowski, et al., the contents of which are hereby incorporated by reference. In addition to creating that a volume, the user also assigns a business value importance and a relevance rating to the created volume in step 815. The business value importance is specified by the user when the volume is created and represents the value that the user assigns to the data. The relevance rating relates to application-specific interaction with a backup, for example, how effectively the system can backup consistent data in the volume. This may be related to application-specific techniques. For example, backing up Microsoft Exchange data involves numerous interactions with the Exchange server to ensure that application level consistency is maintained. If such techniques are not present, then the relevance of a backup is reduced as the data that is backed up may not be a consistent view of the data at a given point in time.

The management module 297 computes a priority for the volume utilizing the assigned business value importance and relevance ratings in step 820. The priority for the volume may be computed using any number of techniques. In illustrative embodiment where the business value importance and relevance rating are numerical, the computed priority may be a summation of the two values, or may be computed using a formula (for example, 2 times the business value importance plus the relevance rating). More generally, the rankings may be computed using any probabilistic weighting algorithm utilizing to some or all of the relevance values. Furthermore, added intelligence may be utilized to vary the ranking algorithm over time in response to changes in data utilization. For example, if usage patterns of a data container match one or more predefined patterns, the ranking for that data container may be increased/decreased based on predefined business intelligence.

The priority may also be assigned qualitatively; for example, if the business value importance and relevance are assigned using a low-medium-high metric, and if both the business value importance and relevance rating are high, the priority is high. Similarly, if both the importance and relevance rating are low, then the priority is low. Any other case, e.g., where one is high and one is low, results in a priority that is medium. In alternate embodiments, such metrics may be implemented as flags that may be utilized in a table to identify appropriate rankings to enable implementations where multiple values are deemed to be of significant importance. The resulting priority is utilized by the management module for policy-based decisions regarding provisioning and management within the information lifecycle management of the volume.

Once the priority has been computed, the management module may perform policy-based PCPI management of the secondary storage utilizing the computed priorities in step 825. The policy based PCPI management may be performed using the computed priorities to determine which of the PCPIs are retained, moved to increased latency storage, etc. Should space constraints arise that require, for example, the amount of free space falling below a predetermined threshold, the module may determine that certain PCPIs be deleted based on priority. For example, PCPIs may be deleted starting from the lowest priority, etc. Similarly, lower priority PCPIs may be migrated from secondary storage to archival storage, thereby freeing space on the second and the secondary storage for higher priority data. The procedure 800 completes in step 830.

To again summarize, the present invention provides for the management of automatic data protection features, e.g., backup scheduling and data storage capabilities, e.g., policy provisioning of a storage system to enable information lifecycle management of data served by the system. The present invention may be implemented within the storage system to enable its use by small and medium businesses without the need for an information technology (IT) staff. An administrator identifies an initial backup window and the management module associated backup operations with time slots therein. Should the mirroring application fail to complete a backup operation within an assigned time slot, the management module may expand the backup window and reassign subsequent backup operations to the expanded time periods within the backup window.

The foregoing description has been directed to specific embodiments of this invention. It will be apparent, however, that other variations and modifications may be made to the described embodiments, with the attainment of some or all of their advantages. It should be noted that while the above description is written in terms of volumes, the teachings of the present invention may be utilized with any form of data containers. As such, the description of volumes should be taken as exemplary only. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for automating management of a plurality of data containers stored on one or more storage devices operatively connected to a computer, comprising:
    computing a priority for a data container of the plurality of data containers using an importance value associated with the data container;
    performing policy based management of the data container based on the computed priority, wherein performing policy based management comprises deleting the data container based on the computed priority;
    assigning, each data container of the plurality of data containers to a respective time slot within a backup window, wherein the backup window comprises a start time and a length of time, and wherein a length of a time slot depends on a size of changes in the assigned data container, so that unassigned time within the backup window is evenly distributed after each assigned time slot, thereby leaving approximately a same amount of unassigned time after each assigned time slot; and
    initiating, during each assigned time slot, one or more backup operations of one or more data containers of the plurality of data containers.

2. The method of claim 1 further comprising:
    initiating a first and second backup operation of the one or more backup operations, and in response to initiating the second backup operation while the first backup operation is ongoing, expanding the backup window.

3. The method of claim 2 further comprising:
    assigning the second backup operation to an additional time slot within the expanded backup window.

4. The method of claim 1 wherein computing the priority further comprises using a relevance rating associated with the data container.

5. The method of claim 1 wherein at least one of the plurality of data containers comprises a volume.

6. The method of claim 1 further comprising:
    migrating the data container to archival storage based on the priority associated with the data container.

7. The method of claim 1 wherein performing policy based management further comprises:
    migrating the data container from a primary storage space to a secondary storage space based on the priority.

8. The method of claim 1 wherein performing policy based management further comprises:
    deleting a persistent consistency point image of the data container.

9. The method of claim 2 further comprising:
    notifying an administrator when expanding the backup window would exceed a predefined maximum.

10. The method of claim 2 wherein the length of the backup window is expanded by 50 percent or more.

11. The method of claim 4 wherein the relevance rating is specific to application level consistency in the data container.

12. The method of claim 1 wherein performing policy based management further comprises:
    deleting the data container from a primary storage space when an amount of free space in the primary storage space falls below a threshold.

13. The method of claim 7 wherein performing policy based management further comprises:
    deleting the data container from the secondary storage space when an amount of free space in the secondary storage space falls below a threshold.

14. The method of claim 1, wherein the start time and the length of time are input via a user interface.

15. A system configured to automate management of a plurality of data containers, comprising:
    a computer comprising a processor, the computer configured to compute a priority for a data container of the plurality of data containers using a value associated with the data container,
    the computer further configured to perform policy based management of the data container based on the computed priority, wherein the policy based management comprises deletion of a persistent consistency point image of the data container,
    the computer further configured to assign, without user intervention, each data container of the plurality of data containers to a respective time slot within a backup window, and wherein the backup window comprises a start time and a length of time, wherein a length of a time slot depends on a size of the assigned is data container, so that unassigned time within the backup window is evenly distributed after each assigned time slot, thereby leaving approximately a same amount of unassigned time after each assigned time slot; and
    the computer further configured to initiate, during each assigned time slot, one or more one or more backup operations of one or more data containers of the plurality of data containers.

16. The system of claim 15 wherein the computer is further configured to perform mirroring operations of the data container between a primary storage space operatively connected to the computer and a secondary storage space operatively connected to the computer.

17. The system of claim 16 wherein the primary storage space and the secondary storage space are serviced by the computer on different storage devices.

18. The system of claim 15 wherein the computer comprises a storage system.

19. The system of claim 15 wherein the policy based management further comprises:
  deletion of one or more persistent consistency point images of the data container.

20. The system of claim 15 wherein the policy based management further comprises:
  migration of the data container from the computer to a second computer based on the computed priority.

21. The system of claim 15 wherein the policy based management further comprises:
  migration of one or more persistent consistency point images of the data container from the computer to a second computer based on the computed priority.

22. The system of claim 15 wherein the value comprises a business importance value and wherein the computed priority is computed from the business importance value and a relevance rating associated with the data container.

23. A non-transitory computer-readable medium containing executable program instructions for execution by a processor for automating management of a plurality of data containers, comprising:
  program instructions that create a data container of the plurality of data containers;
  program instructions that compute a priority for the data container using an importance value associated with the data container;
  program instructions that perform policy based management of the data container based on the computed priority, wherein the program instructions that perform policy based management comprise program instructions that delete the data container based on the computed priority;
  program instructions that assign, without user intervention, each data container of the plurality of data containers to a respective time slot within a backup window, wherein the backup window comprises a start time and a length of time, and wherein a length of a time slot depends on a size of changes in the assigned data container, so that unassigned time within the backup window is evenly distributed after each assigned time slot, thereby leaving approximately a same amount of unassigned time after each assigned time slot; and
  program instructions that initiate, during each assigned time slot, one or more backup operations of one or more data containers of the plurality of data containers.

24. The method of claim 1 further comprising:
  scheduling generation of a persistent consistency point image of the data container.

25. The method of claim 1 wherein assigning each data container to the respective time slot within the backup window further comprises:
  expanding the backup window to increase the length of time; and
  apportioning the increased length of time to an additional time slot within the backup window.

26. The method of claim 1 wherein the importance value is a qualitative value.

\* \* \* \* \*

UNITED STATES PATENT AND TRADEMARK OFFICE
CERTIFICATE OF CORRECTION

PATENT NO. : 8,423,731 B1  
APPLICATION NO. : 11/590356  
DATED : April 16, 2013  
INVENTOR(S) : Gokul Nadathur et al.

Page 1 of 1

It is certified that error appears in the above-identified patent and that said Letters Patent is hereby corrected as shown below:

In the Specification

In col. 2, line 30 should read:  
computer that "connects" to the ~~stores age~~ storage system over a In col. 3, line 66 should read:  
disk ~~Mode~~ inode arrangement in accordance with an embodiment In col. 14, line 29 should read:  
utilizing ~~to~~ some or all of the relevance values. Furthermore, In the Claims In col. 16, line 49 should read:  
~~Is~~ data container, so that unassigned time within the Signed and Sealed this  
Eighteenth Day of June, 2013

Teresa Stanek Rea  
*Acting Director of the United States Patent and Trademark Office*